US011851229B2

(12) United States Patent
Lovvorn et al.

(10) Patent No.: US 11,851,229 B2
(45) Date of Patent: Dec. 26, 2023

(54) SYSTEMS AND METHODS FOR COUNTING AND INSPECTING OBJECTS

(71) Applicant: VMEK GROUP LLC, Midlothian, VA (US)

(72) Inventors: Kent Lovvorn, Moseley, VA (US); Andrew Mire, Richmond, VA (US)

(73) Assignee: VMEK Group LLC, Midlothian, VA (US)

( * ) Notice: Subject to any disclaimer, the term of this patent is extended or adjusted under 35 U.S.C. 154(b) by 259 days.

(21) Appl. No.: 17/527,293

(22) Filed: Nov. 16, 2021

(65) Prior Publication Data

US 2022/0156547 A1 May 19, 2022

Related U.S. Application Data

(60) Provisional application No. 63/144,203, filed on Feb. 1, 2021, provisional application No. 63/115,872, filed on Nov. 19, 2020.

(51) Int. Cl.
*B65B 57/20* (2006.01)
*B65B 5/10* (2006.01)
*G06M 7/02* (2006.01)
*B65G 43/08* (2006.01)

(52) U.S. Cl.
CPC ............. *B65B 57/20* (2013.01); *B65B 5/103* (2013.01); *B65G 43/08* (2013.01); *G06M 7/02* (2013.01)

(58) Field of Classification Search
CPC ......... B65B 5/103; B65B 5/106; B65B 5/108; B65B 57/20; B65G 43/08; G06M 7/02; G06M 7/04
See application file for complete search history.

(56) References Cited

U.S. PATENT DOCUMENTS

| 2002/0153292 | A1* | 10/2002 | Monti | B65B 57/20 209/939 |
| 2007/0012604 | A1* | 1/2007 | Basford | B07C 5/368 209/644 |
| 2009/0056825 | A1* | 3/2009 | Mertens | B65B 57/10 141/83 |
| 2012/0085686 | A1* | 4/2012 | Radema | B65G 47/08 209/552 |
| 2015/0271399 | A1* | 9/2015 | Chan | G06T 7/20 348/135 |
| 2021/0346916 | A1* | 11/2021 | Kumar | B07C 5/34 |

* cited by examiner

*Primary Examiner* — Patrick O'Neill
(74) *Attorney, Agent, or Firm* — Thedford I. Hitaffer; Hitaffer & Hitaffer, PLLC

(57) ABSTRACT

A system for count separation of objects comprises a controller, cameras adapted to detect each individual object in a stream of falling objects such that the controller can count the objects, a first receiving location adapted to directly receive the stream of falling objects, a second receiving location adapted to receive objects diverted from the stream of falling objects or to receive the stream of falling objects when the stream of falling objects is diverted from the first receiving location; a mechanical diverter having (a) a first position to not divert the stream of falling objects from the first receiving location and (b) a second position in to divert the stream of falling objects to the second receiving location, and an air blast diverter adapted (a) to divert specific objects or the stream of falling objects to the second location.

6 Claims, 9 Drawing Sheets

Target Count = 4

FIG. 7
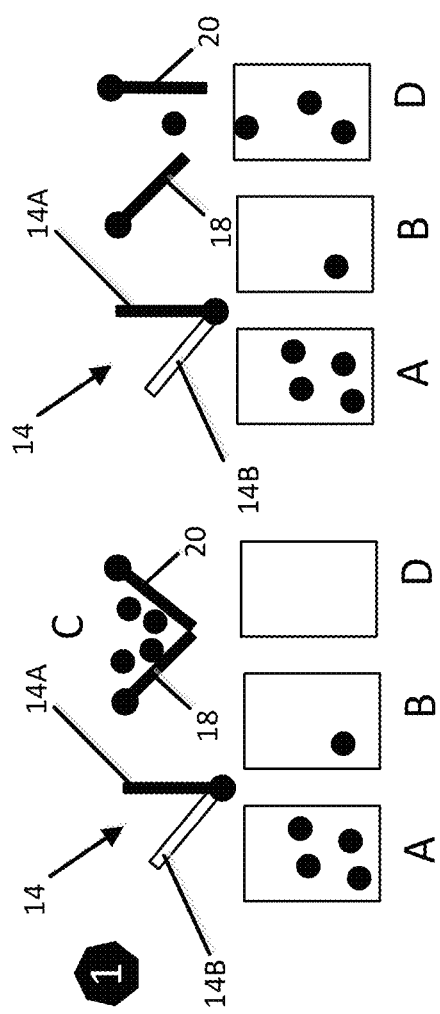
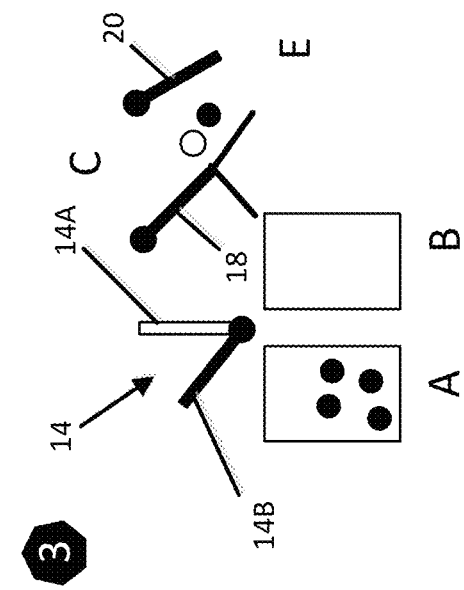
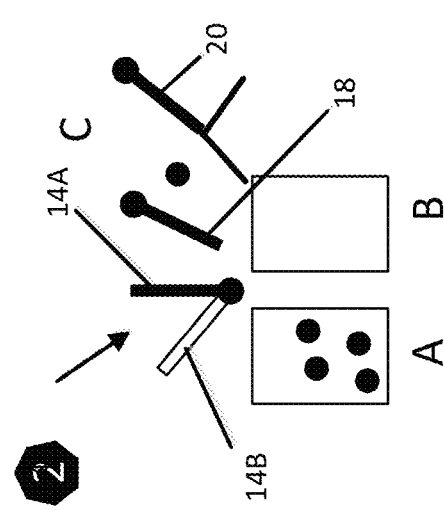

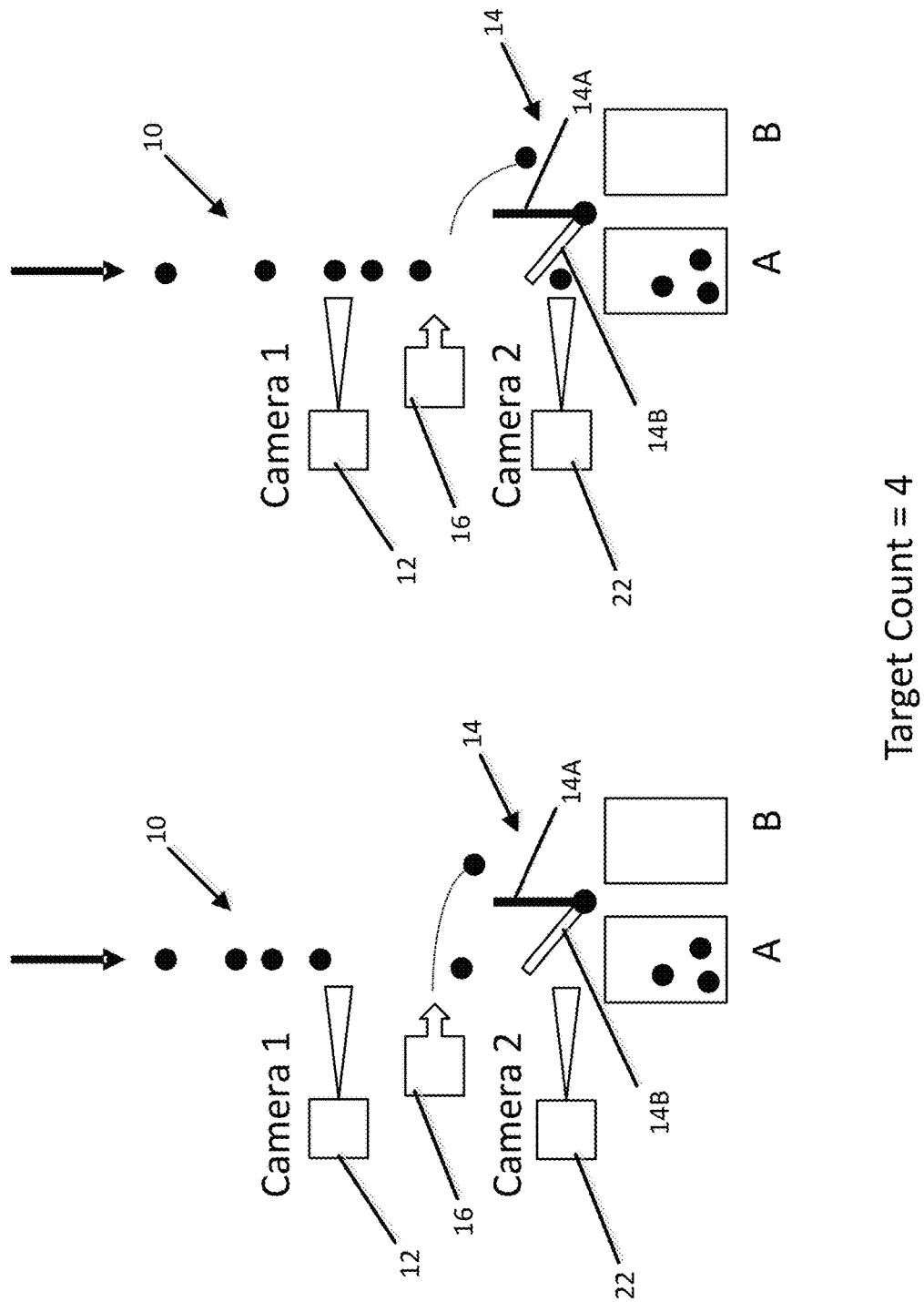

SYSTEMS AND METHODS FOR COUNTING AND INSPECTING OBJECTS

CROSS-REFERENCE TO RELATED APPLICATIONS

This application claims priority to U.S. Provisional Application Ser. No. 63/115,872, filed Nov. 19, 2020, and U.S. Provisional Application Ser. No. 63/144,203, filed Feb. 1, 2021, the contents of which are incorporated herein by reference in their entirety.

FIELD OF THE INVENTION

The present invention relates to imaging systems, such as for counting and inspecting objects.

BACKGROUND OF THE DISCLOSURE

It is known to use imaging systems with high-speed cameras to count objects (parts, etc.) as the objects fall off the end of a chute. For example, FIG. 1 shows a conventional system for counting the parts 10 as the objects free fall off the end of a chute (not illustrated). The parts 10 are illuminated and imaged using one or more conventional high-speed cameras 12. Each part is isolated and inspected. If multiple cameras are used, the images are combined to produce a single part for analysis. Each part is analyzed, classified, and validated. Only valid parts are counted. Parts that are not valid are typically tracked for handling at a later time.

FIG. 2 shows another conventional system that may be used for small or large counts when exact counting is NOT required. The system of FIG. 2 alternates filling directly into positions A and B (each of which may be a container of any suitable kind). The parts 10 are illuminated and imaged using one or more high-speed cameras 12. All parts are inspected and validated before counting. A conventional mechanical divider 14 is in a first position 14A to enable the parts to fall into Position A. The parts fall directly into Position A until the target count is reached. Then, the mechanical divider 14 is switched automatically into its second position 14B to divert the parts into position B until the target count is reached. While the parts are diverted into Position B, the parts are emptied or moved out of Position A. The above steps repeat continuously to alternately fill Position A and Position B.

In the system of FIG. 2, the position of the mechanical divider is switched when the container being filled is determined to have reached its target count based on the counting of the parts as they fall, typically taking into account the time it takes for the parts to fall from the imaging location (i.e., adjacent the camera 12) to the mechanical divider. However, due to the high volume of parts falling off the chute and being counted and the time it takes for the mechanical divider to change positions, it is likely that the containers will contain slightly greater or slightly fewer parts than desired. That is why the system of FIG. 2 is used when exact counting is not required.

BRIEF SUMMARY OF THE DISCLOSURE

In one embodiment of the invention, a system for count separation of objects comprises a controller, one or more cameras adapted to detect each individual object in a stream of falling objects and to indicate a presence of each object to the controller such that the controller can count the objects, a first receiving location adapted to directly receive the stream of falling objects, a second receiving location adapted to receive the stream of falling objects when the stream of falling objects is diverted from the first receiving location, and an air blast diverter adapted to divert all objects in the stream of falling objects such that the stream of falling objects is received at the second location. When the controller has determined that a total number of objects either (a) in the first receiving location or (b) detected by the one or more cameras and en route to the first receiving location equals a first receiving location target count, the controller activates the air blast diverter to divert all objects in the stream of falling objects into the second location. When the controller has determined that a total number of objects in the first receiving location equals the first receiving location target count, the controller either (a) causes the objects to be dispensed from the first receiving location or (b) activates a signal for the objects to be removed from the first receiving location. When the controller has determined that a total number of objects either (a) in the second receiving location or (b) detected by the one or more cameras and en route to the second receiving location equals a second receiving location target count, the controller deactivates the air blast diverter such that the falling stream of objects are received at the first location. When the controller has determined that a total number of objects in the second receiving location equals the second receiving location target count, the controller either (a) causes the objects to be dispensed from the second receiving location or (b) activates a signal for the objects to be removed from the second receiving location.

In alternative embodiments of the invention, a system for count separation of objects comprises a controller, one or more first cameras adapted to detect each individual object in a stream of falling objects and to indicate a presence of each object to the controller such that the controller can count the objects, a first receiving location adapted to directly receive the stream of falling objects, a second receiving location adapted to receive objects diverted from the stream of falling objects or to receive the stream of falling objects when the stream of falling objects is diverted from the first receiving location, a mechanical diverter having (a) a first position in which the mechanical diverter is adapted to not divert the stream of falling objects from being received at the first receiving location and (b) a second position in which the mechanical diverter is adapted to divert the stream of falling objects such that the stream of falling objects is received at the second receiving location, and an air blast diverter adapted (a) to divert specific objects from the stream of falling objects such that the specific diverted objects are received at the second receiving location or (b) to divert all objects in the stream of falling objects such that the stream of falling objects is received at the second location. When the mechanical diverter is in the first position and the controller has determined that a total number of objects either (a) in the first receiving location or (b) detected by the one or more first cameras and en route to the first receiving location equals a target count, the controller causes the mechanical diverter to begin moving to the second position and activates the air blast diverter to divert all objects in the stream of falling objects into the second location until the mechanical diverter has reached the second position, at which time the controller will deactivate the air blast diverter such that the mechanical diverter is diverting the stream of falling objects into the second location. When the mechanical diverter is in the second position and the controller has determined that a total number of objects either (a) in the second receiving location or (b) detected by the one or more first cameras and en route to the second receiving location equals the target count minus a predetermined number of objects, the controller causes the mechanical diverter to begin moving to the first position and activates the air blast diverter to divert all objects in the stream of falling objects into the second location until the mechanical diverter has reached the first position and the total number of objects either in the second receiving location or detected by the one or more first cameras and en route to the second receiving location equals the target count, at which time the controller will deactivate the air blast diverter such that the falling stream of objects are received at the first location.

The system may further comprise one or more second cameras downstream of the mechanical diverter and adapted to detect each individual object going into the first location and to indicate a presence of each object to the controller. Based on a predetermined distance between the one or more first cameras and the one or more second cameras and based on a predetermined time for objects to fall the predetermined distance between the one or more first cameras and the one or more second cameras, the controller may determine if each object detected by the one or more first cameras is also detected by the one or more second cameras. If the controller determines that an object detected by the one or more second cameras was intended to go into the second receiving location, the controller may either (a) increment a first receiving location count and decrement a second receiving location count or (b) provide a count error alert. If the controller determines that an object was intended to go into the first receiving location but is not detected by the one or more second cameras, the controller may either (a) decrement the first receiving location count and increment the second receiving location count or (b) provide a count error alert.

In alternative embodiments of the invention, a system for count separation of objects comprises a controller, one or more first cameras adapted to detect each individual object in a stream of falling objects and to indicate a presence of each object to the controller such that the controller can count the objects, a mechanical diverter, an air blast diverter, a first receiving location adapted to directly receive the stream of falling objects, a second receiving location adapted to receive the stream of falling objects when the stream of falling objects is diverted from the first receiving location by the mechanical diverter, a third receiving location adapted to receive specific objects diverted from the stream of falling objects by the air blast diverter or to receive the stream of falling objects when all objects in the stream of falling objects are diverted from the first receiving location by the air blast diverter, and a fourth receiving location adapted to receive objects from the third receiving location. The third receiving location is adapted to dispense objects into either the second receiving location or the fourth receiving location. The mechanical diverter has (a) a first position in which the mechanical diverter is adapted to not divert the stream of falling objects such that the stream of falling objects is received at the first receiving location and (b) a second position in which the mechanical diverter is adapted to divert the stream of falling objects such that the stream of falling objects is received at the second receiving location. The air blast diverter is adapted (a) to divert specific objects from the stream of falling objects such that the specific diverted objects are received at the third receiving location or (b) to divert all objects in the stream of falling objects such that the stream of falling objects is received at the third location. When the mechanical diverter is in the first position and the controller has determined that a total number of objects either in the first receiving location or detected by the one or more first cameras and en route to the first receiving location equals a target count, the controller causes the mechanical diverter to begin moving to the second position and activates the air blast diverter to divert the stream of falling objects into the third location. When the mechanical diverter is in the second position and the controller has determined that a total number of objects either in the second receiving location or detected by the one or more first cameras and en route to the second receiving location equals the target count, the controller causes the mechanical diverter to begin moving to the first position and activates the air blast diverter to divert the stream of falling objects into the third location.

When the mechanical diverter has been moved from the first position to the second position, the controller may either (a) continue the air blast diverter to divert the stream of falling objects into the third location until a number of objects in the third location equals the target count, deactivates the air blast diverter when the number of objects in the third location equals the target count such that the stream of objects are diverted by the mechanical diverter into the second location, and causes the objects in the third location to be dispensed into the fourth location, or (b) deactivate the air blast diverter such that the stream of objects are diverted by the mechanical diverter into the second location, cause the objects in the third location to be dispensed into the second location, and increment a count of the object in the second location by a count of the objects dispensed from the third location into the second location.

When the mechanical diverter has been moved from the second position to the first position, the controller may either (a) continue the air blast diverter to divert the stream of falling objects into the third location until a number of objects in the third location equals the target count, deactivates the air blast diverter when the number of objects in the third location equals the target count such that the stream of objects fall into the first location, and causes the objects in the third location to be dispensed into the fourth location, or (b) deactivate the air blast diverter such that the stream of objects fall into the first location, cause the objects in the third location to be dispensed into the second location after the second location has been emptied, and increment a count of the objects in the second location by a count of the objects dispensed from the third location into the second location.

Alternative embodiments of the invention comprise methods of count separating objects using the systems described herein.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIGS. 6 and 7 is a functional block diagram of an imaging system for count separation of objects, in accordance with alternative embodiments of the present invention.

FIG. 9 is a functional block diagram of an imaging system for count verification of objects, in accordance with alternative embodiments of the present invention.

DETAILED DESCRIPTION OF THE DISCLOSURE

Figure 1:
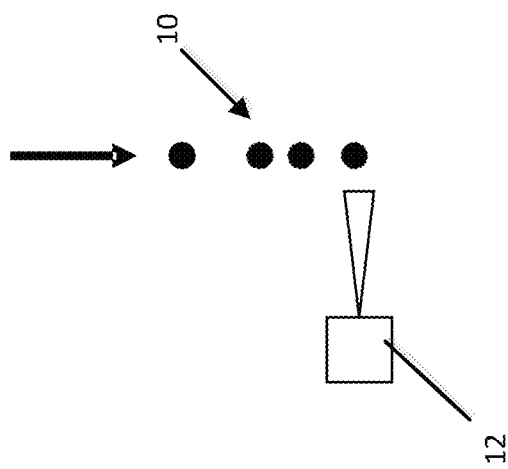
FIG. 1 is a functional block diagram of a conventional imaging system for inspection, validation, and counting of objects.
Figure 2:
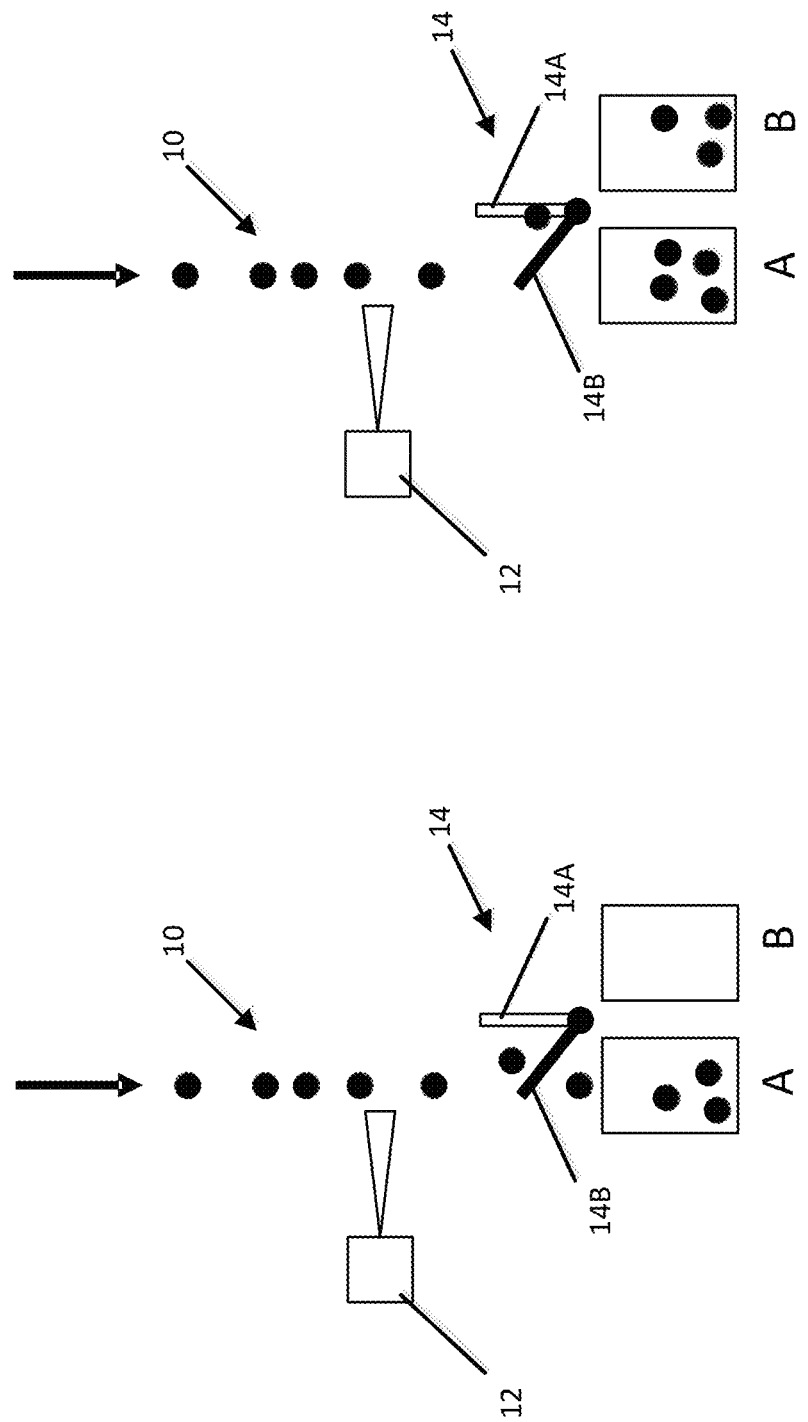
FIG. 2 is a functional block diagram of a conventional imaging system for count separation of objects.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise systems and methods for performing count separation of objects (parts, pills, etc.) as the objects are in mid-air, such as when falling from a hopper or falling off a conveyor. The goal of this solution is to count and inspect parts as are they are falling, then divide them into a target count for packaging. If the parts are determined to be invalid, then the part or package can be removed. In addition, data will be collected on each part and package (a collection of parts). The figures show the parts 10 in a single stream for simplicity; however, the parts being counted by the systems and methods of embodiments of the invention will typically not be in a single stream but rather will be in a large quantity falling off a conveyor or chute. The vertical downward-pointing arrows in the figures indicate the falling motion of the objects. The hopper or conveyor or the like from which the material is dropping is not illustrated.

Figure 3:
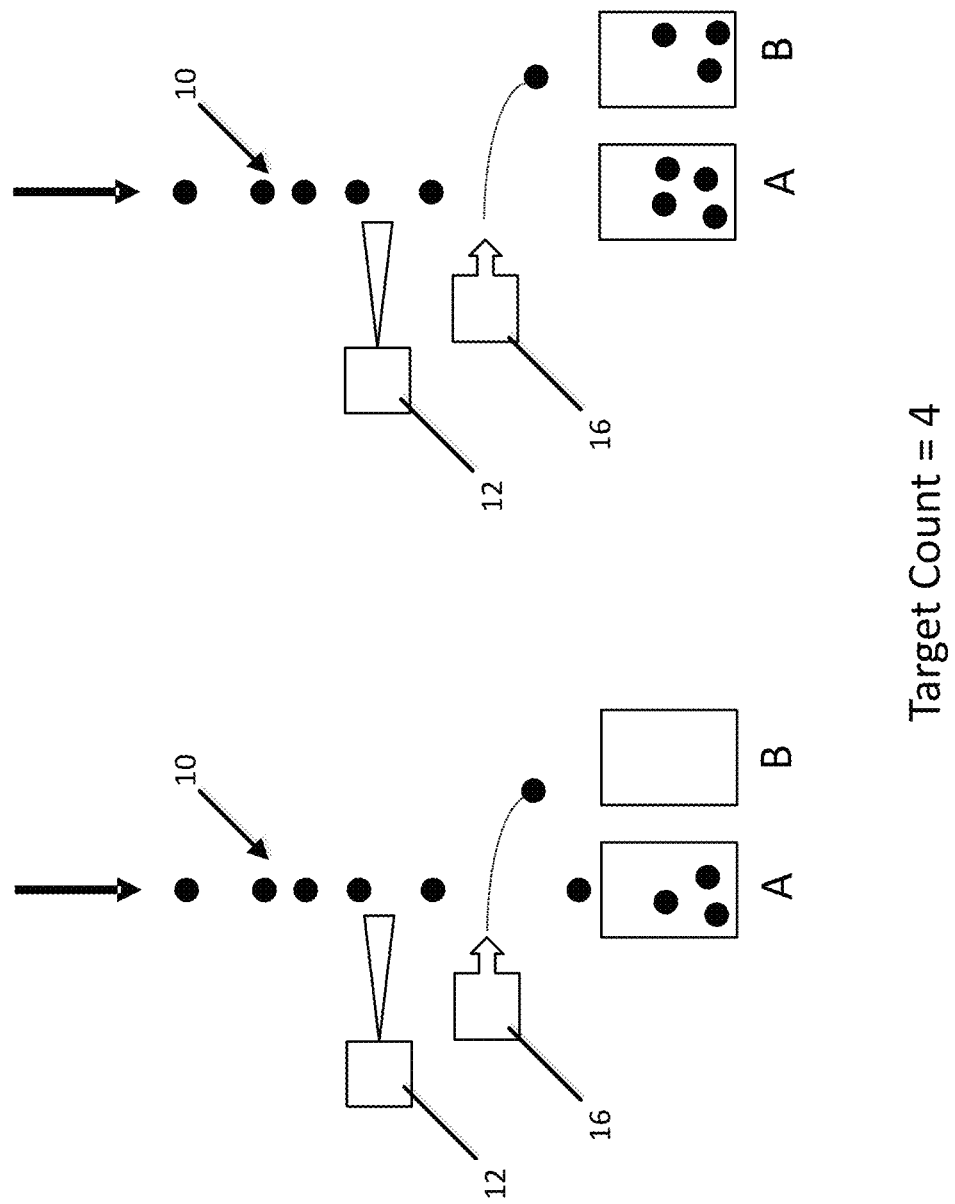
FIG. 3 is a functional block diagram of an imaging system for count separation of objects, in accordance with embodiments of the present invention.

FIG. 3 illustrates a system for count separation using an air blast diverter. This system is typically used for small counts (<10) when exact counting is required. The system of FIG. 3 alternates filling directly into positions A and B (each of which may be a container of any suitable kind). The parts 10 are illuminated and imaged using one or more conventional high-speed cameras 12. All parts are inspected and validated before counting. The parts fall directly into Position A until the target count is reached. When the target count in Position A is reached, a blast of air from a conventional air blast diverter 16 blasts each subsequent object into Position B until the target count in Position B is reached. An air blast diverter uses a focused stream of air to move an individual component (typically moving the component from within a stream of parts to a location outside of the stream). When dealing with parts cascading in a stream from a chute (or the like), the air blast diverter will typically have a large number of air nozzles, each capable of producing an air blast to move a part that is in a different portion of the stream (as is conventionally known). While the parts are diverted into Position B, the parts are emptied (such as via a dispenser mechanism (not illustrated) or moved out of Position A (a signal may be issued that Position B has reached the target count and should be emptied). The above steps repeat continuously to alternately fill Position A and Position B.

Figure 4:
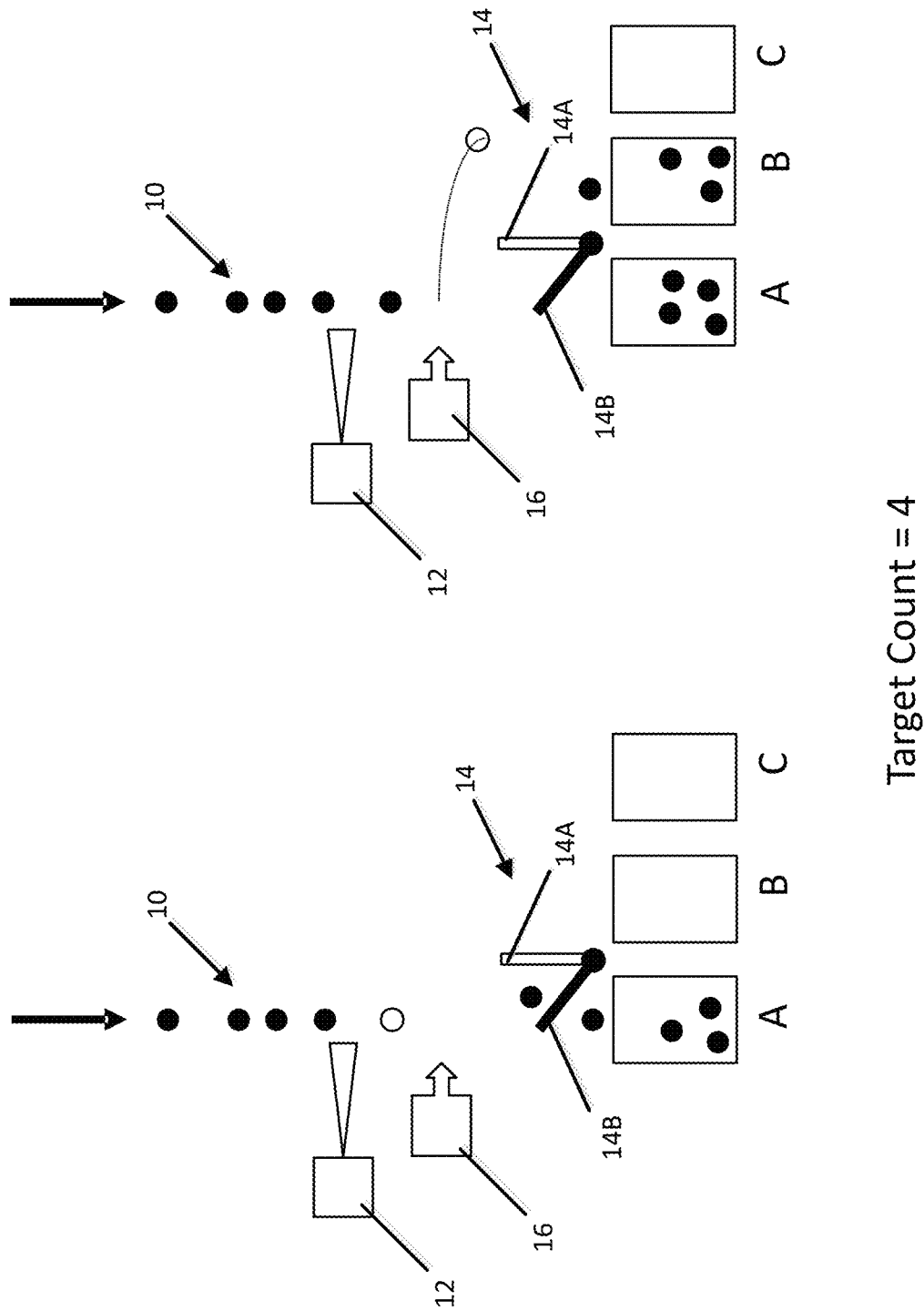
FIG. 4 is a functional block diagram of an imaging system for count separation of objects, in accordance with alternative embodiments of the present invention.

FIG. 4 illustrates a system for count separation using a conventional mechanical diverter while ejecting invalid parts. The mechanical diverter (also termed a mechanical divider) comprises any suitable mechanism for moving or diverting a stream of parts. The system of FIG. 4 alternates filling directly into positions A and B. The parts 10 are illuminated and imaged using one or more conventional high-speed cameras 12. All parts are inspected and validated before counting. A conventional mechanical divider 14 is in a first position 14A to enable the parts to fall into Position A. The parts fall directly into Position A until the target count is reached. Then, the mechanical divider 14 is switched automatically into its second position 14B to divert the parts into position B until the target count is reached. While the parts are diverted into Position B, the parts are emptied or moved out of Position A. The above steps repeat continuously to alternately fill Position A and Position B. In the system of FIG. 4, invalid parts (represented by the white dot) are diverted to Position C using a blast of air from an air blast diverter 16.

In the system of FIG. 4, the position of the mechanical divider is switched when the container being filled is determined to have reached its target count based on the counting of the parts as they fall, typically taking into account the time it takes for the parts to fall from the imaging location (i.e., adjacent the camera 12) to the mechanical divider. However, due to the high volume of parts falling off the chute and being counted and the time it takes for the mechanical divider to change positions, it is likely that the containers will contain slightly greater or slightly fewer parts than desired. That is why the system of FIG. 4 is used when exact counting is not required.

Figure 5:
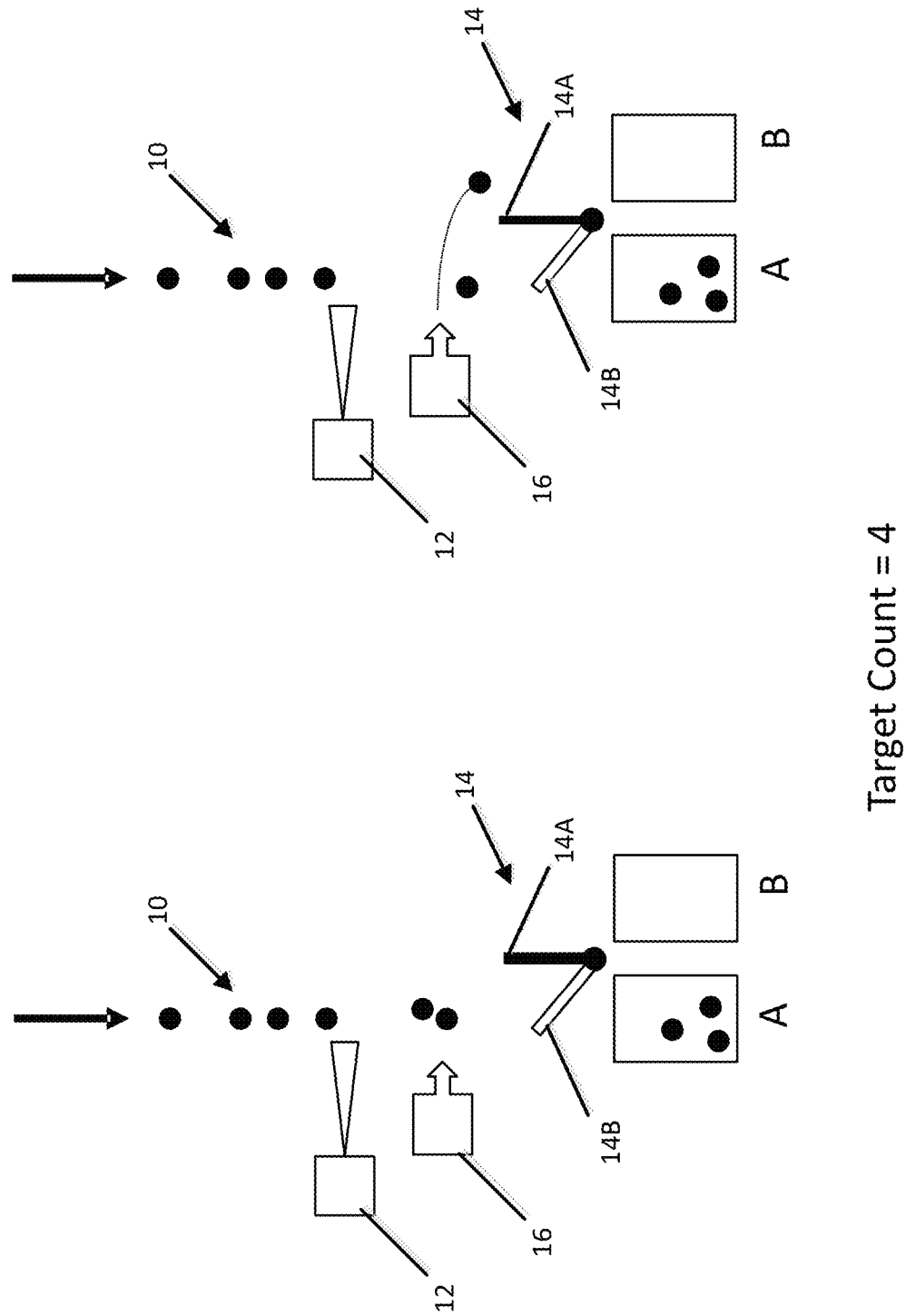
FIG. 5 is a functional block diagram of an imaging system for count separation of objects, in accordance with alternative embodiments of the present invention.

FIG. 5 illustrates a system for count separation using mechanical and air blast diverters. This system is typically used for large or small counts when exact counting is required. The system of FIG. 5 alternates filling directly into positions A and B. The parts 10 are illuminated and imaged using one or more conventional high-speed cameras 12. All parts are inspected and validated before counting. A conventional mechanical divider 14 is in a first position 14A to enable the parts to fall into Position A. The parts fall directly into Position A until the target count is reached. Then, the mechanical divider 14 is switched automatically into its second position 14B to divert the parts into position B until the target count is reached. While the parts are diverted into Position B, the parts are emptied or moved out of Position A. The above steps repeat continuously to alternately fill Position A and Position B.

In the system of FIG. 5, the position of the mechanical divider is switched when the container being filled is determined to have reached its target count based on the counting of the parts as they fall, typically taking into account the time it takes for the parts to fall from the imaging location (i.e., adjacent the camera 12) to the mechanical divider. However, due to the high volume of parts falling off the chute and the time it takes for the mechanical divider to change positions, it is likely that the last part or few parts that should fall into Position A and the first part or few parts that should be diverted into Position B (or vice versa) will be too close together to be correctly segregated and directed into the appropriate position. If the parts are too close together for the mechanical diverter 14 to properly segregate and direct the parts during the transition from filling one position to filling another position, a blast of air from an air blast diverter 16 is used to direct the parts into the appropriate position until the mechanical diverter 14 has time to transition into its new position. When transitioning from filling Position A to filling Position B, the air blast diverter 16 will direct parts into Position B starting when the target count for Position A is met (even though all of the parts may not yet have reached Position A) until the mechanical diverter 14 has been moved into its second position 14B, at which point the air blast diverter 16 is not needed and the mechanical diverter will direct the parts into Position B. When transitioning from filling Position B to filling Position A, the air blast diverter 16 will direct parts into Position B starting before the target count for Position B is reached (for example, if the Position B target count is 100, the air blast diverter may begin directing parts into Position B when the count has reached 90 or 95) until the mechanical diverter 14 has been moved into its first position 14A, at which point the air blast diverter 16 is not needed and the mechanical diverter 14 will direct the parts into Position A. When transitioning from filling Position B to filling Position A, the mechanical diverter 14 has to be proactively moved before the Position B target count is met to ensure that parts can begin falling into Position A as soon as Position B's target count is met. This is why the air blast diverter must take over diverting parts into Position B before the Position B target count is met, so that parts continue to be correctly diverted into Position B during the transition of the mechanical diverter 14 from 14B to 14A.

Figure 6:
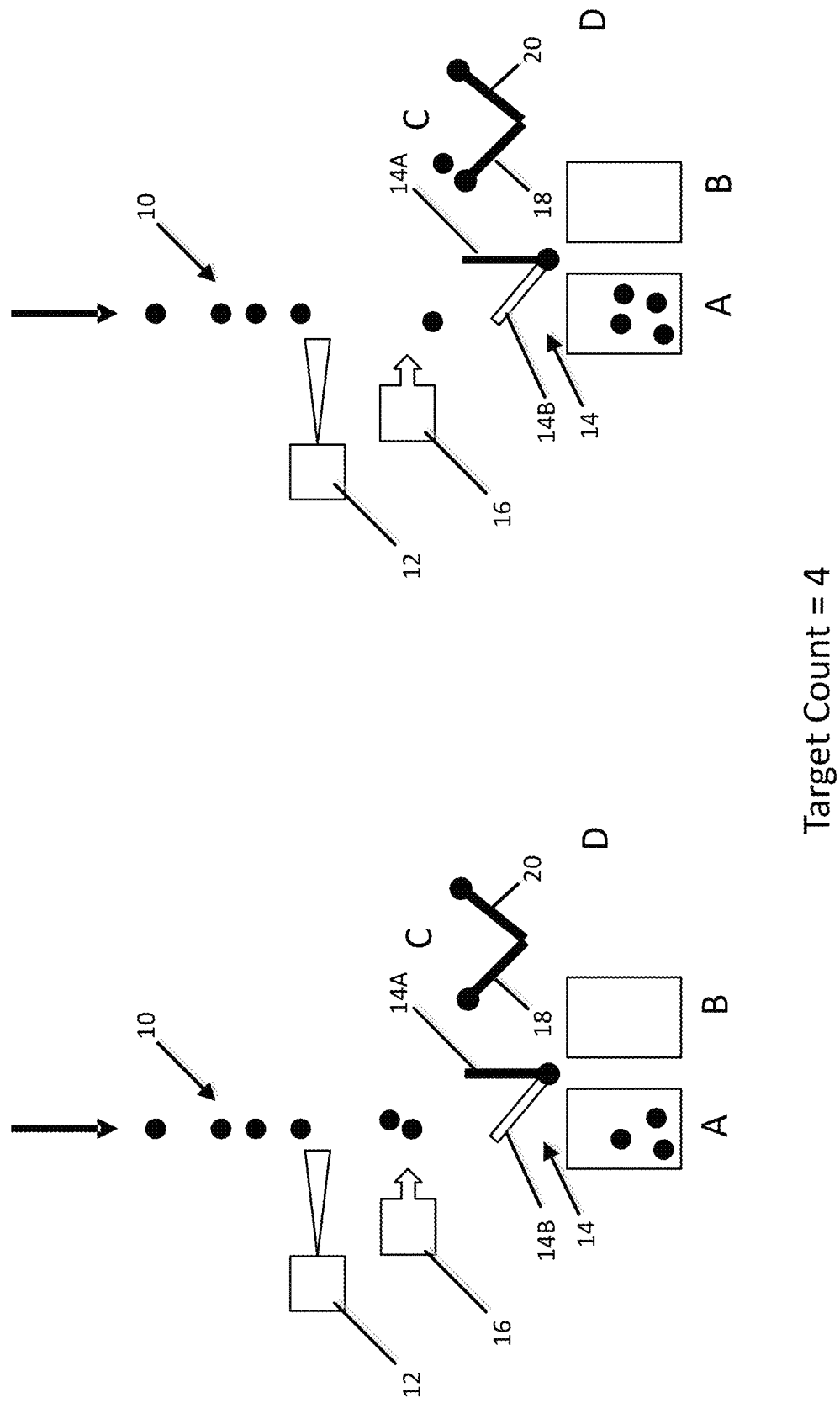

FIGS. 6 and 7 illustrate a system for count separation using mechanical and air blast diverters while ejecting invalid parts. This system is typically used for large or small counts when exact counting is required. The system of FIGS. 6 and 7 alternates filling directly into positions A and B. The parts 10 are illuminated and imaged using one or more conventional high-speed cameras 12. All parts are inspected and validated before counting. A conventional mechanical divider 14 is in a first position 14A to enable the parts to fall into Position A. The parts fall directly into Position A until the target count is reached. Then, the mechanical divider 14 is switched automatically into its second position 14B to divert the parts into position B until the target count is reached. While the parts are diverted into Position B, the parts are emptied or moved out of Position A. The above steps repeat continuously to alternately fill Position A and Position B.

In the system of FIGS. 6 and 7, the position of the mechanical divider 14 is switched when the container being filled is determined to have reached its target count based on the counting of the parts as they fall, typically taking into account the time it takes for the parts to fall from the imaging location (i.e., adjacent the camera 12) to the mechanical divider 14. However, due to the high volume of parts falling off the chute and the time it takes for the mechanical divider 14 to change positions, it is likely that the last part or few parts that should fall into Position A and the first part or few parts that should be diverted into Position B (or vice versa) will be too close together to be correctly segregated and directed into the appropriate position. If the parts are too close together for the mechanical diverter 14 to properly segregate and direct the parts during the transition from filling one position to filling another position, a blast of air from an air blast diverter 16 is used to direct the parts into Position C until the mechanical diverter 14 has time to transition into its new position. When transitioning from filling Position A to filling Position B, the air blast diverter 16 will direct parts into Position B starting when the target count for Position A is met (even though all of the parts may not yet have reached Position A) until the mechanical diverter 14 has been moved into its second position 14B, at which point the air blast diverter 16 is not needed and the mechanical diverter will direct the parts into Position B. When transitioning from filling Position B to filling Position A, the air blast diverter 16 will direct parts into Position B starting before the target count for Position B is reached (for example, if the Position B target count is 100, the air blast diverter may begin directing parts into Position B when the count has reached 90 or 95) until the mechanical diverter 14 has been moved into its first position 14A, at which point the air blast diverter 16 is not needed and the mechanical diverter 14 will direct the parts into Position A. When transitioning from filling Position B to filling Position A, the mechanical diverter has to be proactively moved before the Position B target count is met to ensure that parts can begin falling into Position A as soon as Position B's target count is met. This is why the air blast diverter must take over diverting parts into Position B before the Position B target count is met, so that parts continue to be correctly diverted into Position B during the transition of the mechanical diverter 14 from 14B to 14A.

Parts that are diverted to Position C by the air blast diverter 16 may be handled in at least three different ways, as illustrated in FIG. 7. As seen in FIG. 7, Position C may have a left diverter 18 and a right diverter 20. Opening the left diverter 18 causes the parts to fall into Position B, while opening the right diverter 20 causes the parts to fall into Position D or Position E. As shown in FIG. 7 option 1, once the part count at Position C equals the target count, Position C parts are emptied or moved to Position D by opening right diverter 20. As shown in FIG. 7 option 2, the parts at Position C can be moved to Position B by opening left diverter 18 to add to Position B's count and to empty Position C. The system may keep track of the number of parts in Position B and the number of parts in Position C, and implement option 2 when the total number of parts in Position B and Position C equal the target count, such that dispensing the parts from Position C into Position B causes Position B to reach the target count. As shown in FIG. 7 option 3, if one or more of the parts diverted to Position C is invalid, then the contents of Position C can be ejected to Position E by opening right diverter 20.

FIG. 9 illustrates a system for count separation and verification using mechanical and air blast diverters. This system is typically used for large or small counts when exact counting is required. FIG. 9 illustrates the use of a second camera to provide 100% verification of the counting. The system of FIG. 9 is nearly identical to the system of FIG. 5, and therefore the operation of the first camera, the air diverter, and the mechanical diverter is the same as in the system of FIG. 5 and therefore will not be described in detail in relation to FIG. 9. The use of such a second camera for count verification may be used with any of the systems described herein or any other suitable accounting system, whether the system uses mechanical diverters, air diverters, or combinations thereof.

As seen in FIG. 9, a conventional second camera 22 is placed downstream of the conventional first camera 12 and the conventional air diverter 16. The second camera 22 is positioned to image only the parts going into Position A. The parts that fall into Position A are actively verified, meaning that the part is identified by both the first camera 12 and the second camera 22. In contrast, the parts that fall into Position B are passively verified, meaning that the part is identified by the first camera 12 and not by the second camera 22. If a part is intended to fall into Position A, the second camera 22 looks for the part a predetermined time after the first camera 12 sees the part. The predetermined time is based upon the rate at which the parts are falling and the distance between the first camera 12 and the second camera 22. If the second camera 22 sees the part as expected, that verifies that the part has fallen into Position A as expected. If a part is intended to fall into position A and is not seen by the second camera 22 at the predetermined time, that indicates that the part was misdirected. If a part is intended to fall into Position B, the second camera 22 again looks for the part of predetermined time after the first camera 12 sees the part. If the second camera 22 does not see the part at the predetermined time, that verifies that the part has fallen into Position B as expected. If the second camera 22 does see the part at the predetermined time, that indicates that the part was misdirected.

If an error is detected during a count, the count can be adjusted on the fly to ensure that each position has the correct number of parts at the end of the count. That is, the system can direct one or more parts into or away from the appropriate position to compensate for misdirected parts. However, if the error is detected at or near the end of the count, there may not be enough/any additional parts flowing through to be able to direct the parts appropriately to correct the error. In such a circumstance, the system may "flag" the container at the position at which the error occurred such that one or more parts may be added or removed manually to the container to correct the error.

Figure 8:
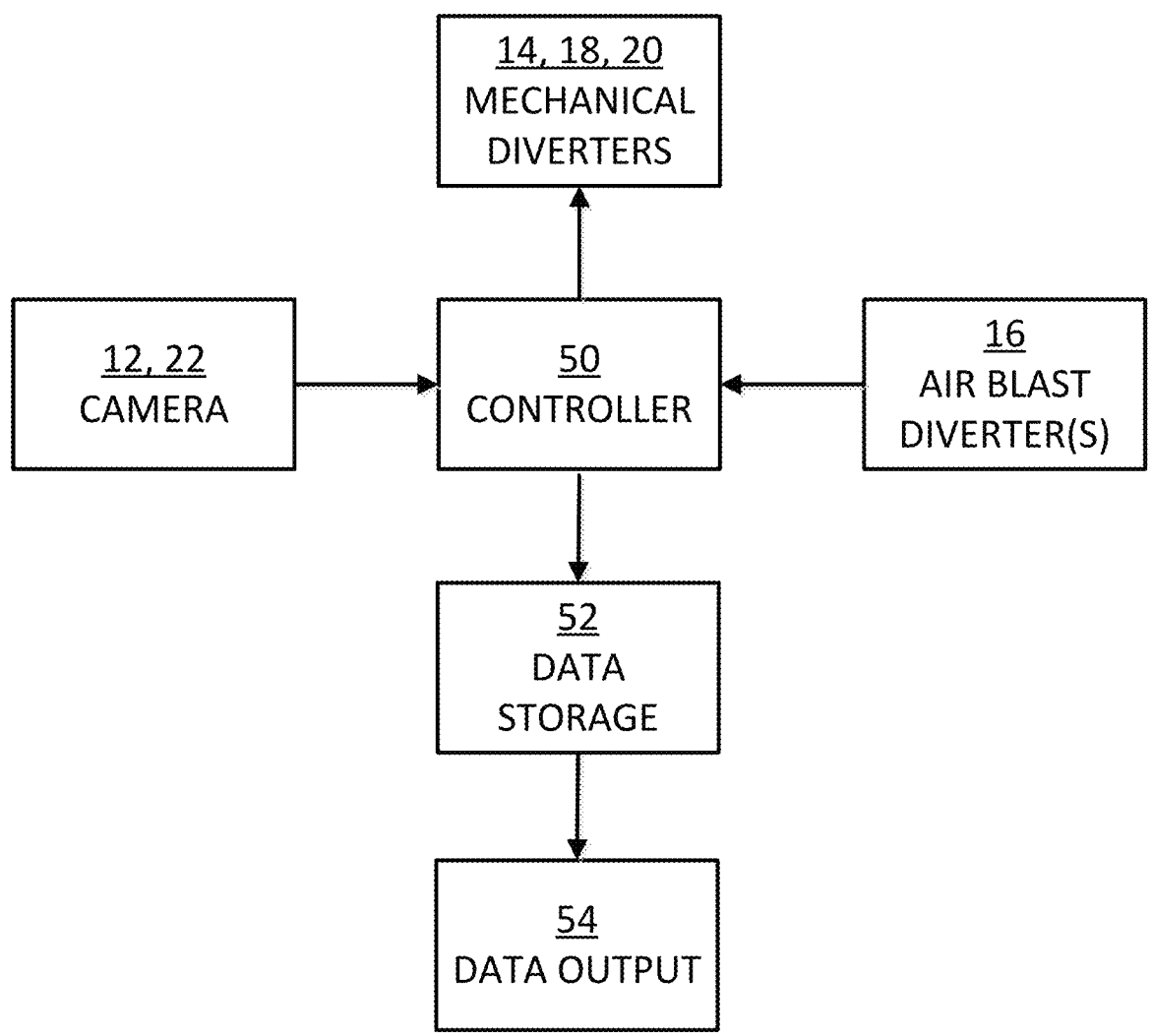
FIG. 8 is a functional block diagram of an imaging system, in accordance with embodiments of the present invention.

Referring now to FIG. 8, the imaging system of embodiments of the invention may comprise a controller 50. The controller 50 may be configured for receiving images from the camera(s) 12, 22, analyzing the image data, acting on the analysis (e.g., activating one or more of mechanical diverters 14, 18, 20 or air blast diverter 16), storing the image data and analyses (such as in data storage module 52), and/or reporting the image data and analyses (such as via a data output device 54, which may comprise a display screen). The controller may comprise a microprocessor, dedicated or general purpose circuitry (such as an application-specific integrated circuit or a field-programmable gate array), a suitably programmed computing device (including a PC or the like), or any other suitable means for controlling the operation of the system.

The present invention may be a system, a device, a method, and/or a computer program product at any possible technical detail level of integration. For example, a device of embodiments of the invention may comprise an imaging system as described above and a computer program product for controlling the operation of the imaging system. As another example, a system of embodiments of the invention may comprise a sorting machine having an imaging system as described above a computer program product for controlling the operation of the sorting system. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams (if any) in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A system for count separation of objects, the system comprising:
    a controller;
    one or more cameras adapted to detect each individual object in a stream of falling objects and to indicate a presence of each object to the controller such that the controller can count the objects;
    a first receiving location adapted to directly receive the stream of falling objects;
    a second receiving location adapted to receive the stream of falling objects when the stream of falling objects is diverted from the first receiving location; and
    an air blast diverter adapted to divert all objects in the stream of falling objects such that the stream of falling objects is received at the second location;
    wherein, when the controller has determined that a total number of objects either (a) in the first receiving location or (b) detected by the one or more cameras and en route to the first receiving location equals a first receiving location target count, the controller activates the air blast diverter to divert all objects in the stream of falling objects into the second location;
    wherein, when the controller has determined that a total number of objects in the first receiving location equals the first receiving location target count, the controller either (a) causes the objects to be dispensed from the first receiving location or (b) activates a signal for the objects to be removed from the first receiving location;
    wherein, when the controller has determined that a total number of objects either (a) in the second receiving location or (b) detected by the one or more cameras and en route to the second receiving location equals a second receiving location target count, the controller deactivates the air blast diverter such that the falling stream of objects are received at the first location; and
    wherein, when the controller has determined that a total number of objects in the second receiving location equals the second receiving location target count, the controller either (a) causes the objects to be dispensed from the second receiving location or (b) activates a signal for the objects to be removed from the second receiving location.

2. A system for count separation of objects, the system comprising:
    a controller;
    one or more first cameras adapted to detect each individual object in a stream of falling objects and to indicate a presence of each object to the controller such that the controller can count the objects;
    a first receiving location adapted to directly receive the stream of falling objects;
    a second receiving location adapted to receive objects diverted from the stream of falling objects or to receive the stream of falling objects when the stream of falling objects is diverted from the first receiving location;

a mechanical diverter having (a) a first position in which the mechanical diverter is adapted to not divert the stream of falling objects from being received at the first receiving location and (b) a second position in which the mechanical diverter is adapted to divert the stream of falling objects such that the stream of falling objects is received at the second receiving location; and an air blast diverter adapted (a) to divert specific objects from the stream of falling objects such that the specific diverted objects are received at the second receiving location or (b) to divert all objects in the stream of falling objects such that the stream of falling objects is received at the second location;

wherein, when the mechanical diverter is in the first position and the controller has determined that a total number of objects either (a) in the first receiving location or (b) detected by the one or more first cameras and en route to the first receiving location equals a target count, the controller causes the mechanical diverter to begin moving to the second position and activates the air blast diverter to divert all objects in the stream of falling objects into the second location until the mechanical diverter has reached the second position, at which time the controller will deactivate the air blast diverter such that the mechanical diverter is diverting the stream of falling objects into the second location; and wherein, when the mechanical diverter is in the second position and the controller has determined that a total number of objects either (a) in the second receiving location or (b) detected by the one or more first cameras and en route to the second receiving location equals the target count minus a predetermined number of objects, the controller causes the mechanical diverter to begin moving to the first position and activates the air blast diverter to divert all objects in the stream of falling objects into the second location until the mechanical diverter has reached the first position and the total number of objects either in the second receiving location or detected by the one or more first cameras and en route to the second receiving location equals the target count, at which time the controller will deactivate the air blast diverter such that the falling stream of objects are received at the first location.

3. The system of claim 2, further comprising:

one or more second cameras downstream of the mechanical diverter and adapted to detect each individual object going into the first location and to indicate a presence of each object to the controller;

wherein, based on a predetermined distance between the one or more first cameras and the one or more second cameras and based on a predetermined time for objects to fall the predetermined distance between the one or more first cameras and the one or more second cameras, the controller determines if each object detected by the one or more first cameras is also detected by the one or more second cameras;

wherein, if the controller determines that an object detected by the one or more second cameras was intended to go into the second receiving location, the controller either (a) increments a first receiving location count and decrements a second receiving location count or (b) provides a count error alert; and wherein, if the controller determines that an object was intended to go into the first receiving location but is not detected by the one or more second cameras, the controller either (a) decrements the first receiving location count and increments the second receiving location count or (b) provides a count error alert.

4. A method for count separation of objects comprising:

detecting, via one or more cameras, each individual object in a stream of falling objects;

counting, via a controller, the objects in the stream of falling objects;

when a total number of objects either (a) in a first receiving location that directly receives the stream of falling objects or (b) detected by the one or more cameras and en route to the first receiving location equals a first receiving location target count, activating an air blast diverter to divert all objects in the stream of falling objects into a second location;

when a total number of objects in the first receiving location equals the first receiving location target count, either (a) dispensing the objects from the first receiving location or (b) activating a signal for the objects to be removed from the first receiving location;

when a total number of objects either (a) in the second receiving location or (b) detected by the one or more cameras and en route to the second receiving location equals a second receiving location target count, deactivating the air blast diverter such that the falling stream of objects are received at the first location; and when a total number of objects in the second receiving location equals the second receiving location target count, either (a) dispensing the objects from the second receiving location or (b) activating a signal for the objects to be removed from the second receiving location.

5. A method for count separation of objects comprising:

detecting, via one or more first cameras, each individual object in a stream of falling objects;

counting, via a controller, the objects in the stream of falling objects;

determining a position of a mechanical diverter having (a) a first position in which the mechanical diverter is adapted to not divert the stream of falling objects from being received at a first receiving location and (b) a second position in which the mechanical diverter is adapted to divert the stream of falling objects such that the stream of falling objects is received at a second receiving location;

when the mechanical diverter is in the first position and a total number of objects either (a) in the first receiving location or (b) detected by the one or more first cameras and en route to the first receiving location equals a target count, causing the mechanical diverter to begin moving to the second position and activating an air blast diverter to divert all objects in the stream of falling objects into the second location;

when the mechanical diverter has reached the second position, deactivating the air blast diverter such that the mechanical diverter is diverting the stream of falling objects into the second location;

when the mechanical diverter is in the second position and a total number of objects either (a) in the second receiving location or (b) detected by the one or more first cameras and en route to the second receiving location equals the target count minus a predetermined number of objects, causing the mechanical diverter to begin moving to the first position and activating the air blast diverter to divert all objects in the stream of falling objects into the second location; and when the mechanical diverter has reached the first position and the total number of objects either in the second receiving location or detected by the one or more first cameras and en route to the second receiving location equals the target count, deactivating the air blast diverter such that the falling stream of objects are received at the first location.

6. The method of claim 5, further comprising:

one or more second cameras downstream of the mechanical diverter and adapted to detect each individual object going into the first location and to indicate a presence of each object to the controller;

wherein, based on a predetermined distance between the one or more first cameras and the one or more second cameras and based on a predetermined time for objects to fall the predetermined distance between the one or more first cameras and the one or more second cameras, the controller determines if each object detected by the one or more first cameras is also detected by the one or more second cameras;

wherein, if the controller determines that an object detected by the one or more second cameras was intended to go into the second receiving location, the controller either (a) increments a first receiving location count and decrements a second receiving location count or (b) provides a count error alert; and wherein, if the controller determines that an object was intended to go into the first receiving location but is not detected by the one or more second cameras, the controller either (a) decrements the first receiving location count and increments the second receiving location count or (b) provides a count error alert.

\* \* \* \* \*